United States Patent
Yamamichi

(10) Patent No.: US 11,422,762 B2
(45) Date of Patent: Aug. 23, 2022

(54) METHOD AND SERVER FOR PROVIDING CLOUD PRINT SERVICE

(71) Applicant: CANON KABUSHIKI KAISHA, Tokyo (JP)

(72) Inventor: Masaki Yamamichi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/328,022

(22) Filed: May 24, 2021

(65) Prior Publication Data

US 2021/0382671 A1    Dec. 9, 2021

(30) Foreign Application Priority Data

Jun. 5, 2020   (JP) .............................. JP2020-098788

(51) Int. Cl.
     *G06F 15/00*      (2006.01)
     *G06F 3/12*      (2006.01)
     *G06K 1/00*      (2006.01)

(52) U.S. Cl.
     CPC .......... *G06F 3/1292* (2013.01); *G06F 3/1204* (2013.01); *G06F 3/1265* (2013.01); *G06F 3/1287* (2013.01)

(58) Field of Classification Search
CPC .... G06F 3/1292; G06F 3/1204; G06F 3/1265; G06F 3/1287

USPC ............................... 358/1.15, 1.13, 1.14, 1.1
See application file for complete search history.

(56) References Cited

U.S. PATENT DOCUMENTS

| | | | |
|---|---|---|---|
| 8,675,234 B2 | 3/2014 | Sato | |
| 2014/0320883 A1* | 10/2014 | Ichida | G06F 21/31 358/1.14 |
| 2016/0170697 A1* | 6/2016 | Kitagata | G06F 3/1287 358/1.15 |
| 2020/0364010 A1* | 11/2020 | Inoue | G06F 3/1204 |

FOREIGN PATENT DOCUMENTS

JP      2012-133489 A      7/2012

* cited by examiner

*Primary Examiner* — Douglas Q Tran
(74) *Attorney, Agent, or Firm* — Venable LLP

(57) ABSTRACT

A first cloud print service has a storage unit that stores a print job received from a client terminal to a first storage region and a first transmission unit that transmits information on the print job to a second cloud print service, which includes a second transmission unit that transmits, to an image forming apparatus, the information on the print job transmitted by the first transmission unit. The image forming apparatus has an input unit that inputs an instruction of performing printing of the print job based on the information on print job transmitted by the second transmission unit and a first printing process unit that receives the print job from the first cloud print service and performs a printing process of the print job when the image forming apparatus is registered in the first cloud print service.

12 Claims, 16 Drawing Sheets

FIG. 8

Print job list window

| Job name | Copy | BW/CL |
|---|---|---|
| Job 1 | 1 | CL |
| Job 2 | 2 | BW |
| Job 4 | 1 | CL |

Print  Delete  Cancel

FIG. 11

```
Print Job Information Acquisition Request on All Users ~~1101
Operation : Get-Jobs Request
Request Attributes : job-name
                    job-id
                    requesting-user-name
                    copies
                    color-mode
Job Description : which-job = false Print Job Information Acquisition Response ~~1102
Operation : Get-Jobs Response
Return code : successful-ok
Job Description : job-id=1
                 job-name="job1"
                 requesting-user-name = "user1"
                 copies=1
                 color-mode="color"
                 job-id=2
                 job-name="job2"
                 requesting-user-name = "user1"
                 copies=2
                 color-mode="monochrome"
                 job-id=3
                 job-name="job3"
                 requesting-user-name = "user2"
                 copies=2
                 color-mode="color"
                 job-id=4
                 job-name="job2"
                 requesting-user-name = "user1"
                 copies=1
                 color-mode="color"
                 job-id=5
                 job-name="job5"
                 requesting-user-name = "user3"
                 copies=1
                 color-mode="color"
```

FIG. 12

```
Print Job Information Acquisition Request on Particular Users ~~1201
Operation : Get-Jobs Request
Request Attributes : job-name
                    job-id
                    requesting-user-name
                    copies
                    color-mode
Job Description : which-job = true
                  requesting-user-name = "user1"

Print Job Information Acquisition Response ~~1202
Operation : Get-Jobs Response
Return code : successful-ok
Job Description : job-id=1
                  job-name="job1"
                  requesting-user-name = "user1"
                  copies=1
                  color-mode="color"
                  job-id=2
                  job-name="job2"
                  requesting-user-name = "user1"
                  copies=2
                  color-mode="monochrome"
                  job-id=4
                  job-name="job2"
                  requesting-user-name = "user1"
                  copies=1
                  color-mode="color"
```

FIG. 13

```
Print Job Motion Request ──── 1301
Operation : Move-job Request
Request Attributes : job-id=1
                    from-printer-id="xxxx-xxxx-xxxx-1111"
                    to-printer-id="xxxx-xxxx-xxxx-2222"
Print Job Motion Response ──── 1302
Operation : Move-job Response
Return code : successful-ok
```

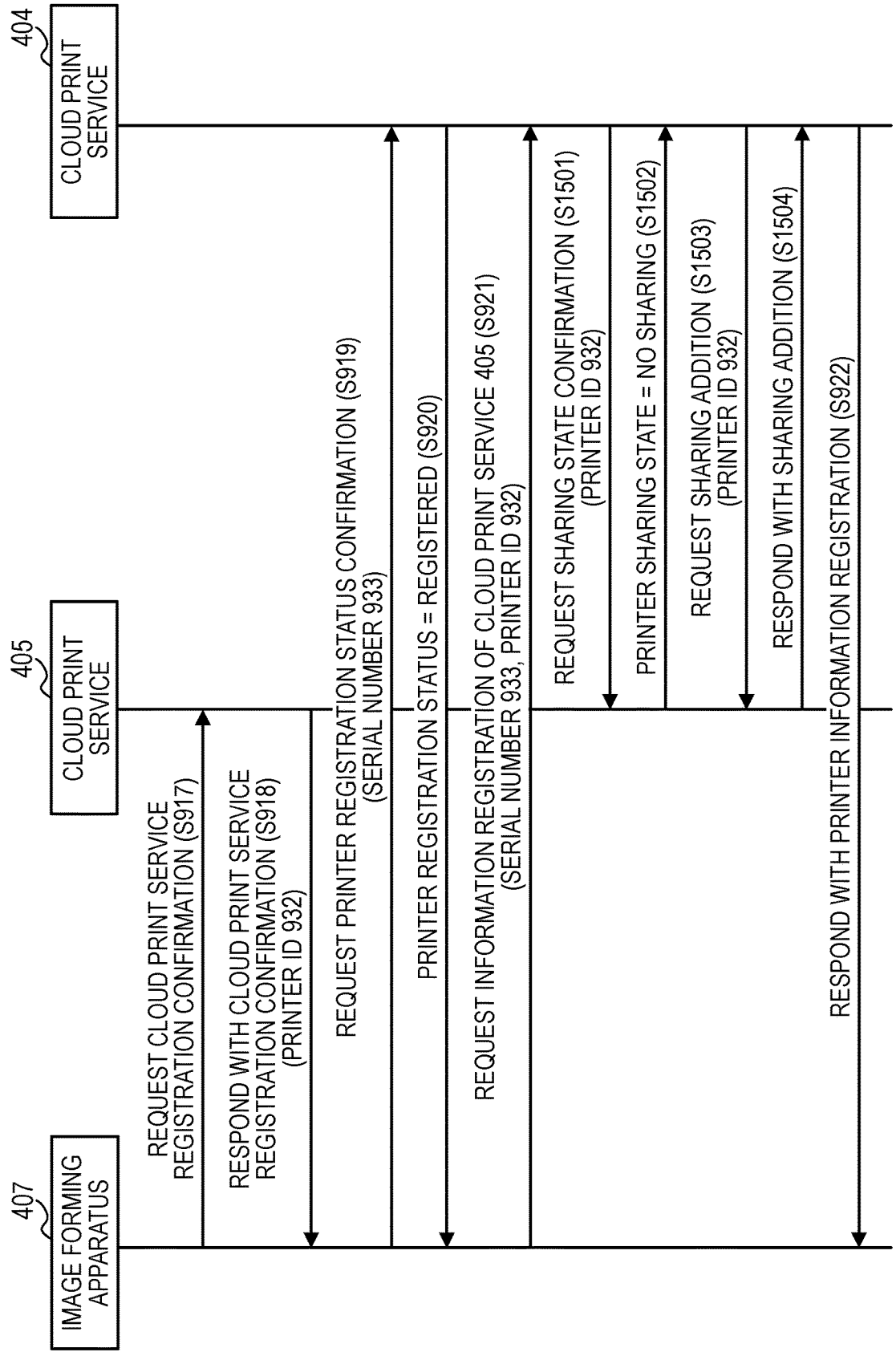

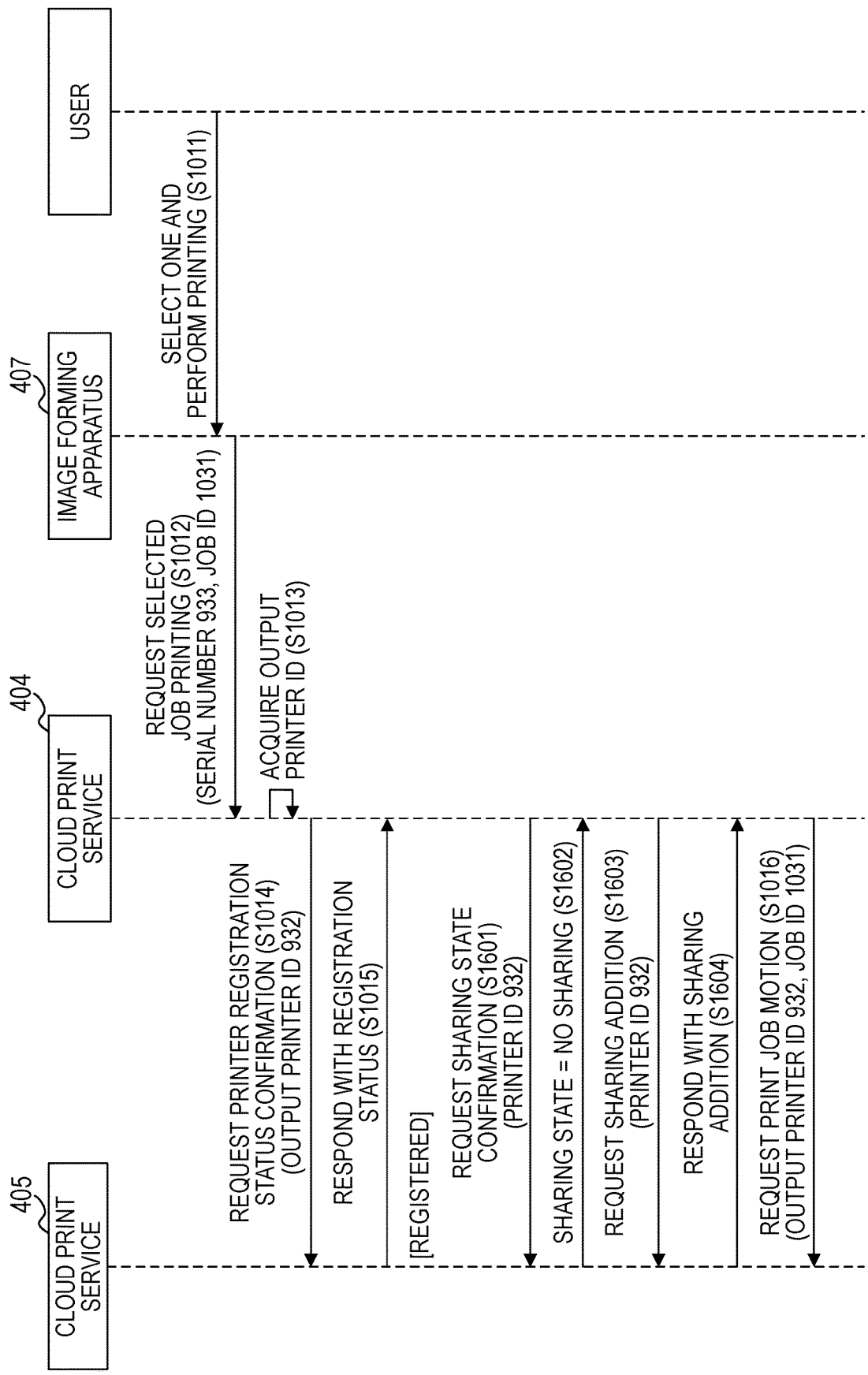

METHOD AND SERVER FOR PROVIDING CLOUD PRINT SERVICE

BACKGROUND OF THE INVENTION

Field of the Invention

The present invention relates to a method and a server for providing a cloud print service.

Description of the Related Art

In recent years, a cloud print service in which a print job is input via a cloud and transmitted to an image forming apparatus has begun to spread (see Japanese Patent Application Laid-Open No. 2012-133489, for example). In such a printing system, first, an administrator registers an image forming apparatus to a tenant of a cloud print service to which the administrator belongs. The administrator sets which user belonging to the tenant is permitted to use the image forming apparatus. Herein, the tenant refers to a use unit of a cloud print service. Specifically, a different tenant is assigned for each organization (for example, each enterprise or each organization) that has made a use contract of a cloud print service.

The user who is permitted to use the image forming apparatus inputs a print job to the cloud print service from the client terminal. The cloud print service saves the received print job in a storage. The image forming apparatus acquires a print job saved in the cloud print service and prints the acquired print job.

In an enterprise environment, client terminals of a plurality of OS vendors (for example, Windows (registered trademark) OS, macOS (registered trademark), Chrome (registered trademark) OS, or the like) are used. Further, a use in a cloud platform has begun to spread in recent years, there are increasing cases where a single business entity uses a plurality of different cloud platforms (for example, AWS, Azure, GoogleCloudPlatform, or the like) in combination. Further, there are also increasing cases where respective platforms provide a cloud print service to the user so that the user who uses respective cloud platforms can easily perform printing.

Japanese Patent Application Laid-Open No. 2012-133489 does not disclose a printing system in which an image forming apparatus uses a plurality of cloud print services. On the other hand, in view of user convenience, it is preferable that a printing apparatus can be used from a plurality of cloud print services. Further, one option may be to transmit a job to the printing apparatus via a plurality of cloud print services and print the job. However, when a plurality of cloud print services save a print job, respectively, this causes a problem of duplicated consumption of storage resources.

SUMMARY OF THE INVENTION

As one aspect of the present invention, one of the objects of the present invention is to store a print job only in a first cloud print service and perform a printing process of the print job in an image forming apparatus without storing the print job in a second cloud print service.

A method of providing a cloud print service of the present invention includes: receiving, from a print client, a print job addressed to a virtual printer associated with another cloud print service that is different from the cloud print service and storing the print job in a spool region; and performing control to select a process of 1) transferring, to the another cloud print service, print data forming the print job addressed to the virtual printer stored in the spool region or 2) providing the print data forming the print job addressed to the virtual printer stored in the spool region, without via the another cloud print service, to an image forming apparatus having image forming hardware corresponding to the virtual printer.

Further features of the present invention will become apparent from the following description of exemplary embodiments with reference to the attached drawings.

BRIEF DESCRIPTION OF THE DRAWINGS

FIG. 8 is a diagram illustrating a window example of an operation unit of an image forming apparatus.

FIG. 11 is a diagram illustrating an example of job information acquisition packets.

FIG. 12 is a diagram illustrating an example of job information acquisition packets.

FIG. 13 is a diagram illustrating an example of job moving packets.

FIG. 15 is a diagram illustrating a part of a registration sequence of the image forming apparatus.

FIG. 16 is a diagram illustrating a part of a printing sequence to the image forming apparatus.

DESCRIPTION OF THE EMBODIMENTS

Figure 1:
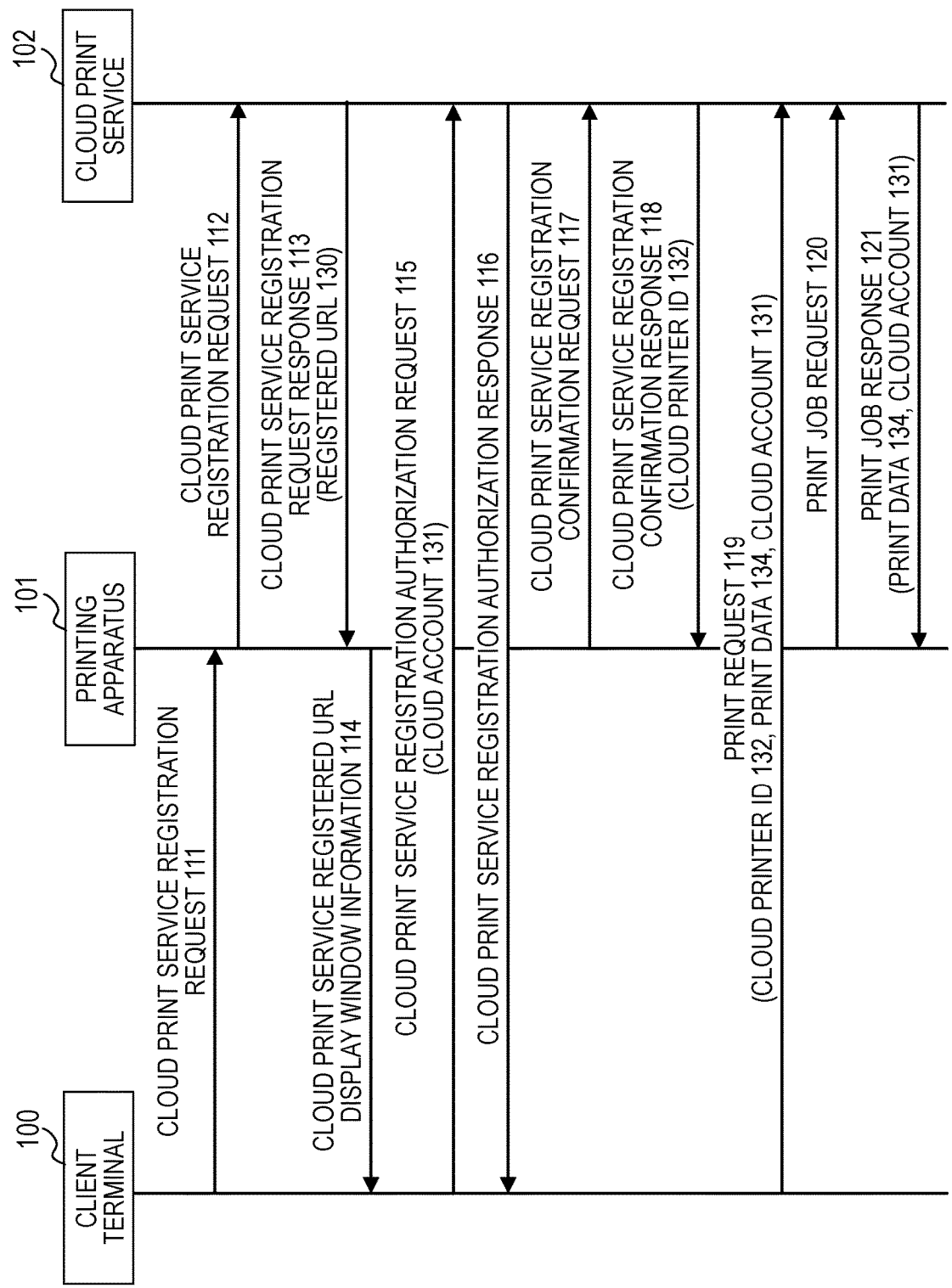
FIG. 1 is a diagram illustrating registration and printing processes of cloud print.

FIG. 1 is a sequence diagram illustrating registration and printing processes of cloud print. A printing system has a client terminal 100, a printing apparatus 101, and a cloud print service 102.

The printing apparatus 101 supports a cloud print function and an WebUI function used for operating the printing apparatus 101. The client terminal 100 supports a cloud print client function and an WebUI client used for operating the WebUI described above. Further, the cloud print service 102 is a cloud print service apparatus on the Internet.

First, a user uses the WebUI client of the client terminal 100 and transmits a cloud print service registration request 111 to the printing apparatus 101 via the WebUI. In response to receiving the cloud print service registration request 111, the printing apparatus 101 transmits a cloud print service registration request 112 to the cloud print service 102. In response to receiving the cloud print service registration request 112, the cloud print service 102 transmits a cloud print service registration request response 113 including a cloud print service registered URL 130 to the printing apparatus 101. In response to receiving the cloud print service registration request response 113, the printing apparatus 101 transmits a registered URL display window information 114 including the cloud print service registered URL 130 to the client terminal 100 via the WebUI.

In response to receiving the registered URL display window information 114, the client terminal 100 displays the registered URL 130 on the WebUI client. The user operates the WebUI client of the client terminal 100 and accesses the displayed registered URL 130. Accordingly, the client terminal 100 transmits a cloud print service registration authorization request 115 including a cloud account 131 to the cloud print service 102. In response to receiving the cloud print service registration authorization request 115, the cloud print service 102 transmits a cloud print service registration authorization response 116 to the client terminal 100.

The printing apparatus 101 transmits a cloud print service registration confirmation request 117 to the cloud print service 102. In response to receiving the cloud print service registration confirmation request 117, the cloud print service 102 transmits a cloud print service registration confirmation response 118 including a cloud printer ID 132 to the printing apparatus 101. In this step, the printing apparatus 101 is registered in the cloud print service 102 and can use the cloud print service.

The client terminal 100 transmits a print request 119 including the cloud printer ID 132, print data 134, and the cloud account 131 to the cloud print service 102. The printing apparatus 101 transmits a print job request 120 to the cloud print service 102. The cloud print service 102 transmits a print job response 121 including the print data 134 and the cloud account 131 to the printing apparatus 101. The printing apparatus 101 prints the received print data 134.

The print job request 120 in the sequence of FIG. 1 is transmitted when the printing apparatus 101 detects that a print job addressed to the printing apparatus 101 is transmitted to the cloud print service 102. Specifically, the detection method is implemented when the printing apparatus 101 receives an event notification from the cloud print service 102. The event notification has two methods of a Pull scheme and a Push scheme.

Figure 2:
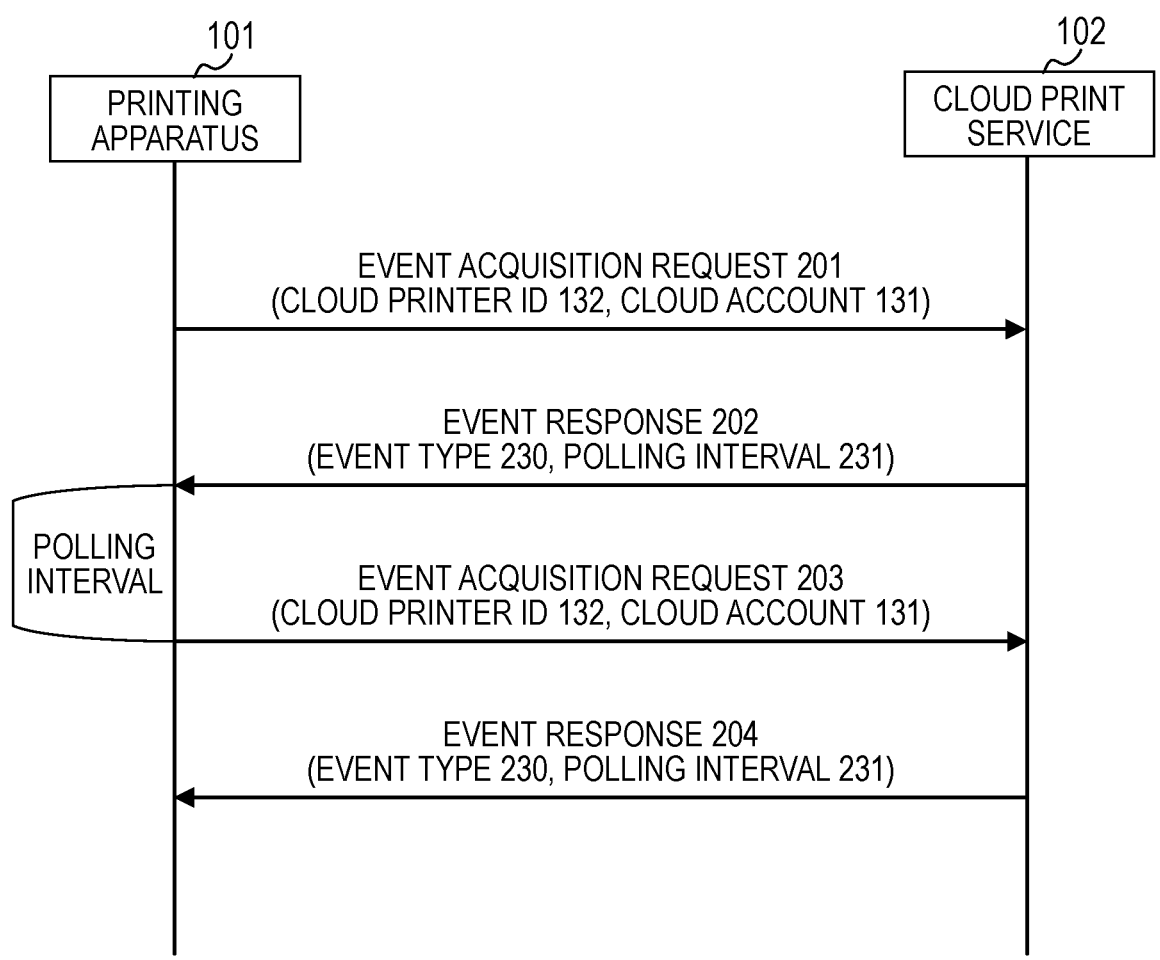
FIG. 2 is a diagram illustrating an event notification (Pull scheme) process of the cloud print.

FIG. 2 is a diagram illustrating a processing sequence of event notification (Pull scheme). The printing apparatus 101 transmits an event acquisition request 201 including the cloud printer ID 132 and the cloud account 131 to the cloud print service 102. In response to receiving the event acquisition request 201, the cloud print service 102 transmits an event response 202 including an event type 230 and a polling interval 231 to the printing apparatus 101. Generated event information is set for the event type 230. As an example, the event information may be information on a job reception event representing reception of a print job addressed to the printing apparatus 101. When no event is generated, no event information is included. The polling interval 231 is provided by the cloud print service 102 to instruct the printing apparatus 101 for an interval before the printing apparatus 101 transmits the next event acquisition request.

In response to receiving the event response 202, the printing apparatus 101 transmits an event acquisition request 203 to the cloud print service 102 again after the passage of time of the polling interval 231 included in the event response 202. The event acquisition request 203 includes the cloud printer ID 132 and the cloud account 131. In the same way as the previous time, in response to receiving the event acquisition request 203, the cloud print service 102 transmits the event response 204 including the event type 230 and the polling interval 231 to the printing apparatus 101. The printing apparatus 101 then repeats the same process as described above in accordance with the polling interval 231.

Figure 3:
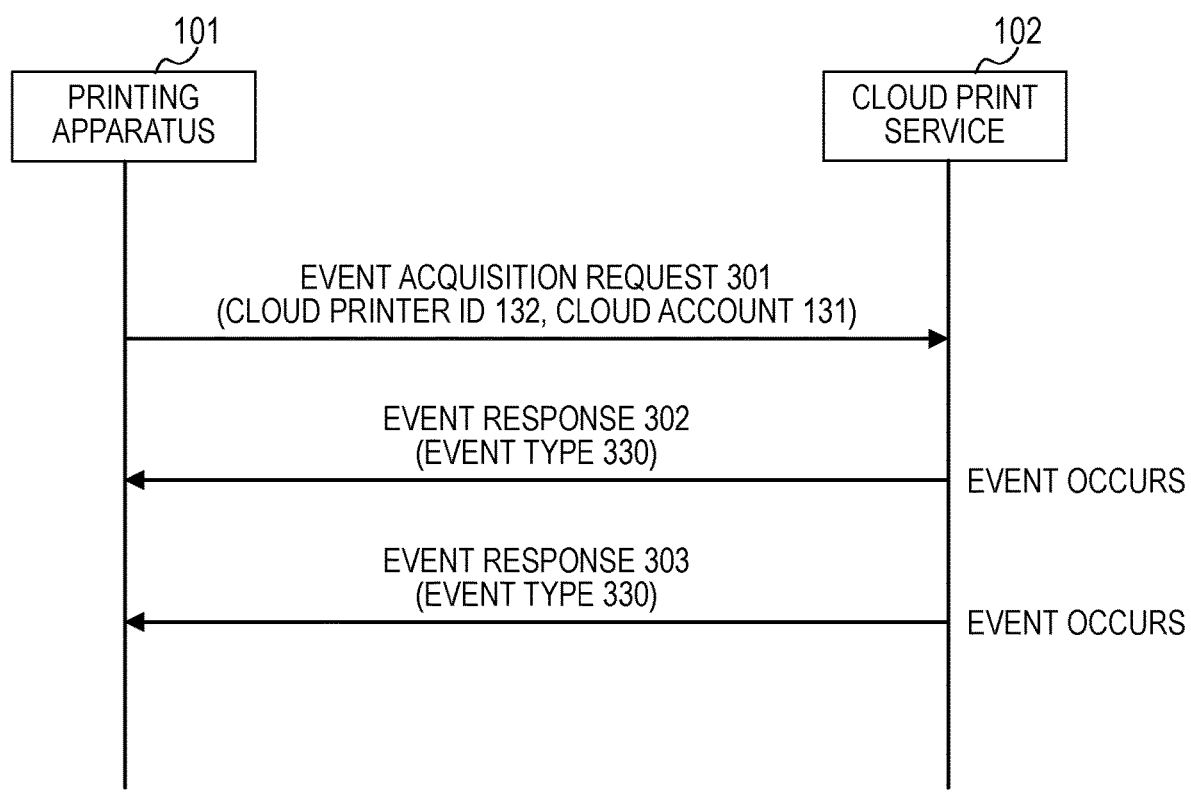
FIG. 3 is a diagram illustrating an event notification (Push scheme) process of the cloud print.

FIG. 3 is a diagram illustrating a processing sequence of event notification (Push scheme). The printing apparatus 101 transmits an event acquisition request 301 including the cloud printer ID 132 and the cloud account 131 to the cloud print service 102. In response to receiving the event acquisition request 301, the cloud print service 102 transmits an event response 302 including an event type 330 to the printing apparatus 101. Generated event information is set for the event type 330. As an example, the event information may be information on a job reception event representing reception of a print job addressed to the printing apparatus 101. When no event is generated, no event information is included.

The printing apparatus 101 maintains network connection with the cloud print service 102 even after receiving the event response 302. When an event is generated, the cloud print service 102 transmits an event response 303 including the event type 330 via the network connection described above at this timing.

The cloud print service may be, for example, GoogleCloudPrint (registered trademark), MicrosoftHybridCloudPrint (registered trademark), UniflowOnLine (registered trademark), or the like.

Figure 4:
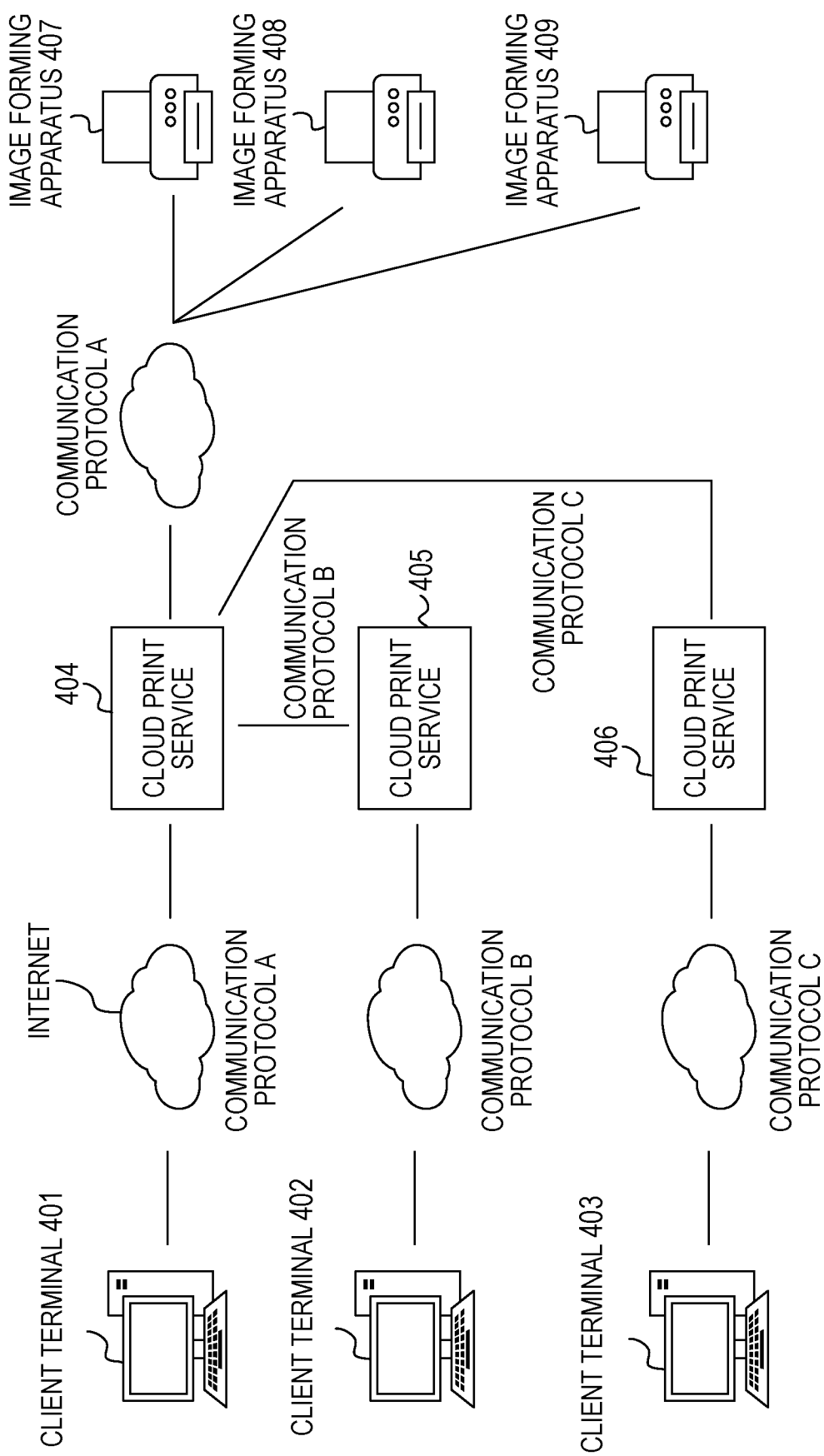
FIG. 4 is a diagram illustrating a network configuration example.

A form in which an image forming apparatus such as the printing apparatus 101 supports a plurality of cloud print services as described above has begun to spread. It can be considered that such plurality of cloud print services (hereinafter, referred to as CPS) are caused to cooperate with each other to implement a cloud print environment. For example, as illustrated in FIG. 4 as an example, there are client terminals 401 to 403, CPSs 404 to 406, and image forming apparatuses 407 to 409. The CPSs 404 to 406 are cloud print service apparatuses. In such a case, one possible configuration may be to transfer data, which has been transmitted and addressed to the CPS 405 or the CPS 406 by the user, via another CPS 404, to the image forming apparatuses 407, 408, and 409 that actually perform printing.

In such a case, the image forming apparatuses 407 to 409 need to support only a communication protocol used in the last routed cloud print service and do not need to support a communication protocol of a cloud print service routed at the time of cooperation. That is, a difference between cloud print services can be absorbed by the last routed cloud print service, and operating cost and maintenance cost of the image forming apparatuses 407 to 409 can be reduced. Further, a user authentication function, a print report function, or the like only need to be aggregated and implemented by the last routed cloud print service and can efficiently implement cloud print.

Figure 5:
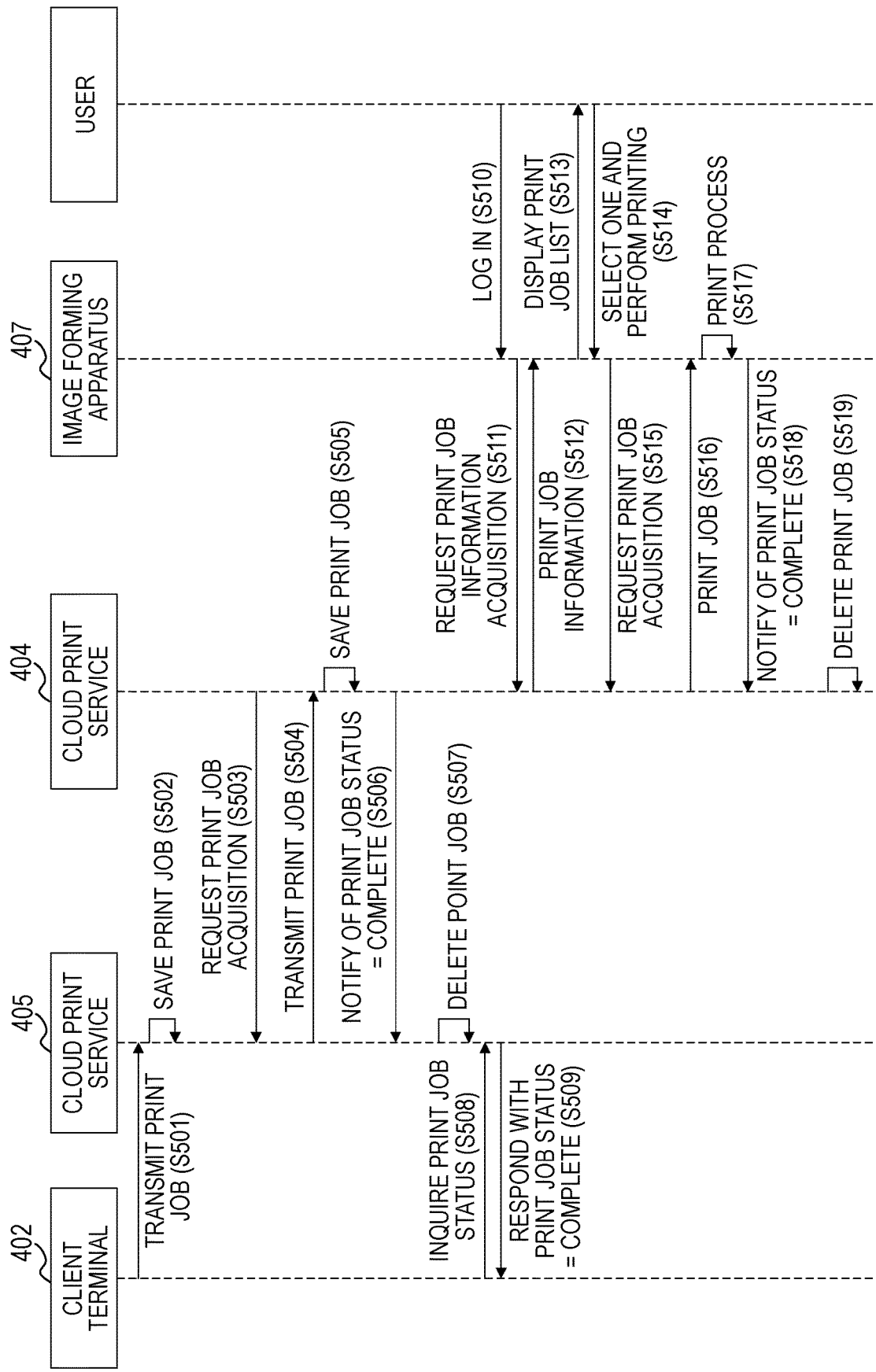
FIG. 5 is a diagram illustrating a printing process performed in cooperation between cloud print services.

When such a cloud print cooperation is performed, a print job is transmitted and printed in accordance with a sequence as illustrated in FIG. 5, for example.

Before FIG. 5 is specifically illustrated, preparations for cooperation will be described. First, in accordance with the registration sequence illustrated in FIG. 1 as an example, the image forming apparatus 407 is registered in advance as an output destination printer that is under CPS 404. This process enables cloud print using a path of "client terminal—CPS 404—image forming apparatus" (path 1) to be performed.

Further, a virtual printer provided by the CPS 404 (hereinafter, also referred to as a virtual printer) as an output destination printer that is under the CPS 405 is registered in the CPS 405 in a pre-registration process. The virtual printer and the registration process thereof will be described. The user such as a tenant administrator registers, to the CPS 404, a virtual printer object used for receiving a print job from the CPS 405. The virtual printer object has a function of temporarily spooling an externally received print job and a function of transferring the spooled print job to an image forming apparatus (for example, the image forming apparatus 407) having a printer engine that is a physical resource. The virtual printer object provided by the CPS 404 functions as a proxy that relays the externally received print job to an apparatus actually having a print capability while behaving like an output printer when viewed from an external cloud print service or a client. Next, the user such as a tenant administrator registers a virtual printer object of the CPS 404 as an output destination printer that is under the CPS 405. This process enables cloud print using a path of "client terminal—CPS 405—CPS 404—image forming apparatus" (path 2) to be performed.

Transfer of data when a print job is transmitted and cloud print is performed via the path 2 will be described with reference to FIG. 5. First, in step S501, the client terminal 402 searches for a printer that is under the CPS 405. Subsequently, the user selects a desired printer out of output destination printers found in the search. Herein, description will be provided assuming that a virtual printer that transmits a print job to the CPS 404 is selected as an output destination printer. In response to accepting an instruction of print start by using a print setting window (not illustrated), the client terminal 402 transmits a print job to the CPS 405. In step S502, the CPS 405 saves the print job in a first save region saving a job to be transferred to the CPS 404. The first save region is a spool region that temporarily saves a print job before the CPS 404 acquires a job.

Next, in step S503, the CPS 404 transmits an acquisition request for acquiring a print job corresponding to a virtual printer to the CPS 405. In step S504, the CPS 405 transmits a print job corresponding to the request to the CPS 404. In step S505, the CPS 404 saves the print job in a save region corresponding to a virtual printer object. In step S506, the CPS 404 transmits a completion notification as the print job status to the CPS 405.

In step S507, in response to receiving the completion notification, the CPS 405 deletes the saved print job from the first save region. Then, in step S508, the client terminal 402 transmits a print job status inquiry to the CPS 405. In step S509, the CPS 405 transmits a completion response as print job status to the client terminal 402.

In step S510, the user logs in the image forming apparatus 407. In step S511, the image forming apparatus 407 transmits a print job information acquisition request to the CPS 404. In step S512, the CPS 404 specifies a print job that can be acquired by the image forming apparatus 407 and generates print job information including a name, setting information, or the like on the specified print job. Subsequently, the CPS 404 transmits the generated print job information to the image forming apparatus 407. In step S513, the image forming apparatus 407 displays a print job list to the user based on the received print job information.

In step S514, the user selects one or more print jobs from the print job list and provides an instruction to perform printing by using the image forming apparatus 407. In step S515, the image forming apparatus 407 transmits an acquisition request for acquiring the selected print job to the CPS 404. In step S516, based on the acquisition request, the CPS 404 specifies a print job required to be acquired and transmits the specified print job to the image forming apparatus 407. In step S517, the image forming apparatus 407 performs a printing process of the print job received from the CPS 404. The printing process in the image forming apparatus 407 will be specifically described. The image forming apparatus 407 has a printer engine as a printing unit that physically performs printing. When printing based on a print job is performed, a controller of the image forming apparatus 407 generates a print image and a print control command to be transferred to the printer engine based on the received print job. The generated print image and print control command are transferred to the printer engine. The printer engine that receives the print image and the print control command feeds a sheet of appropriate size from a sheet feeding cassette (not illustrated) to a conveyance path (not illustrated) based on the print image and the print control command. Subsequently, the printer engine prints the image on the sheet fed on the conveyance path. The sheet on which printing has been completed (print material) is output to a sheet discharge tray (not illustrated). The printing scheme of the printer engine may be an electro-photographic scheme in which a toner is transferred and fixed on a sheet or may be an ink-jet scheme in which an ink is ejected and printed on a sheet.

Returning to the description of FIG. 5, in step S518, the image forming apparatus 407 transmits a completion notification as the print job status to the CPS 404. In step S519, is response to receiving the completion notification, the CPS 404 deletes, from the save region, the print job that is saved in a save region corresponding to a virtual printer and corresponds to the completion notification.

At the timing of step S509, even though the user has not yet actually printed a print job, the spooler of the client terminal 402 is in the print job completion status, and it is not possible to manage the correct job status when viewed from the user.

Therefore, even after acquiring a print job, instead of a completion notification, the CPS 404 may provide a notification such as Pending or Pending-Held representing that the print job is being saved.

Figure 6:
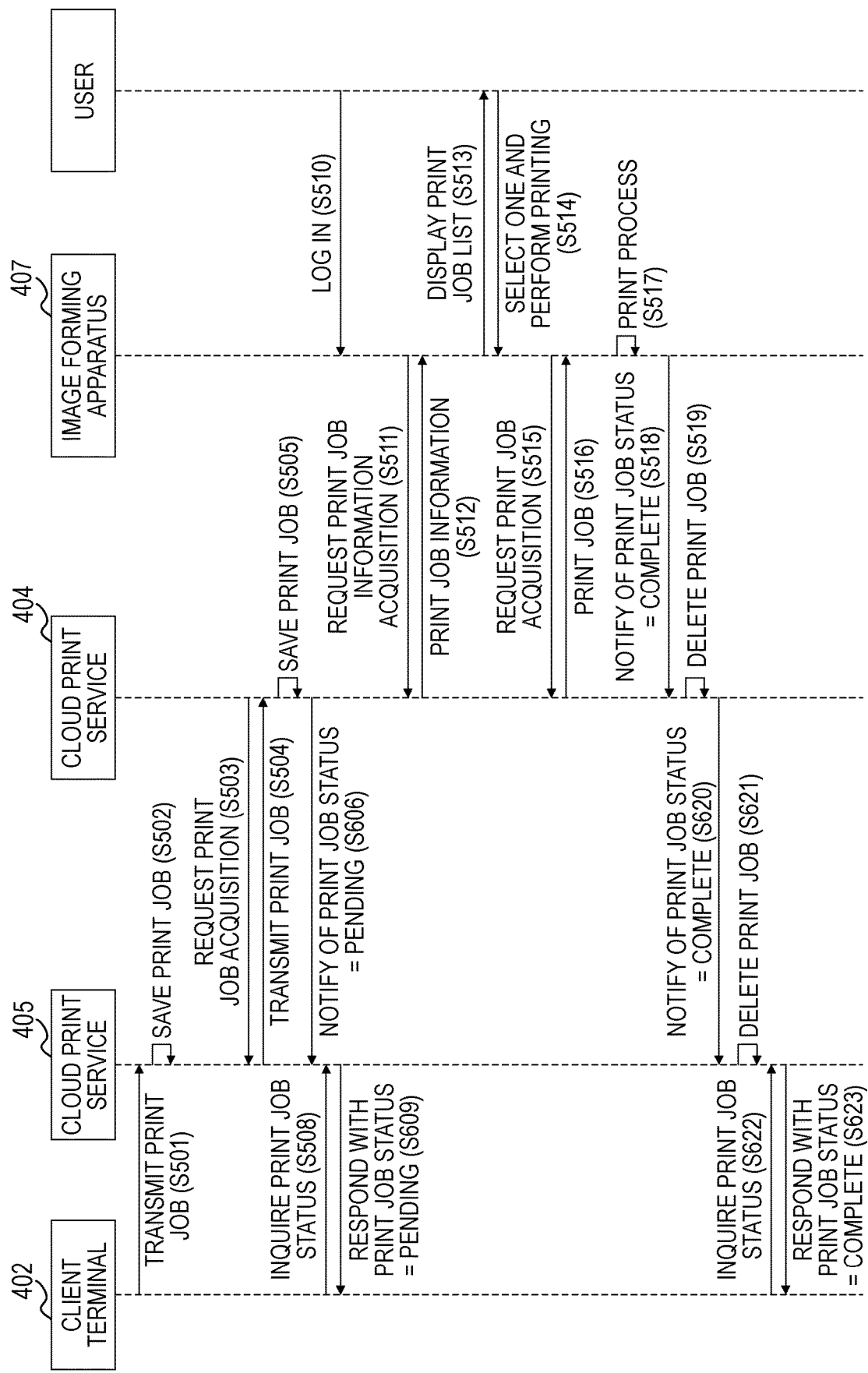
FIG. 6 is a diagram illustrating a printing process performed in cooperation between cloud print services.

In such a case, for example, as illustrated in FIG. 6, in step S606 instead of step S506 of FIG. 5, the CPS 404 transmits, to the CPS 405, a Pending notification representing that a print job is being saved as the print job status. Step S507 of FIG. 5 is omitted. In step S609 instead of step S509 of FIG. 5, the CPS 405 transmits a Pending response as the print job status to the client terminal 402.

In step S620 after step S519, the CPS 404 transmits a completion notification as the print job status to the CPS 405. In step S621, in response to receiving the completion notification, the CPS 405 deletes the print job saved in the first save region from a storage. In step S622, the client terminal 402 transmits a print job status inquiry to the CPS 405. In step S623, the CPS 405 transmits a completion response as the print job status to the client terminal 402.

Before the user completes printing, the client terminal 402 can manage the correct job status as illustrated in steps S609 and S623. In this method, however, a print job is saved in both storages of the CPS 405 and the CPS 404 from step S505 to S518, which causes a problem of duplicated consumption of resources.

Further, in steps S504 and S516, there is a problem of increased traffic because communication for transmitting a print job to the image forming apparatus 407 via the CPS 404 by the CPS 405 occurs. This becomes an important problem in a cloud system which is billed in accordance with the quantity of used storage or traffic. The embodiments for solving the above problem will be described below.

First Embodiment

<Network Configuration>

FIG. 4 is a block diagram illustrating a configuration example of a printing system according to the first embodiment of the present invention. The printing system has client terminals 401 to 403, CPSs 404 to 406, and image forming apparatuses 407 to 409. The CPSs 404 to 406 are cloud print service apparatuses.

The client terminals 401 to 403 transmit a print job to the CPSs 404 to 406, respectively. The CPS 404 is a cloud print service apparatus that receives a print job from the client terminal 401 and receives a print job from the CPSs 405 and 406. The CPSs 405 and 406 are cloud print services that receive a print job from the client terminals 402 and 403, respectively, and save the print job. The CPS 404 to the CPS 406 are cloud print services provided from different companies, respectively. The image forming apparatuses 407 to 409 receive a print job from the CPS 404 and perform a printing process of the print job.

The components described above are connected to each other so as to communicate with each other via a network. The network is a communication network implemented by using any of a LAN, a WAN, a telephone line, a private digital line, an ATM, or the like such as the Internet or a combination thereof, for example. The network only needs to be capable of transmitting and receiving data.

<Hardware Configuration>

Figure 7:
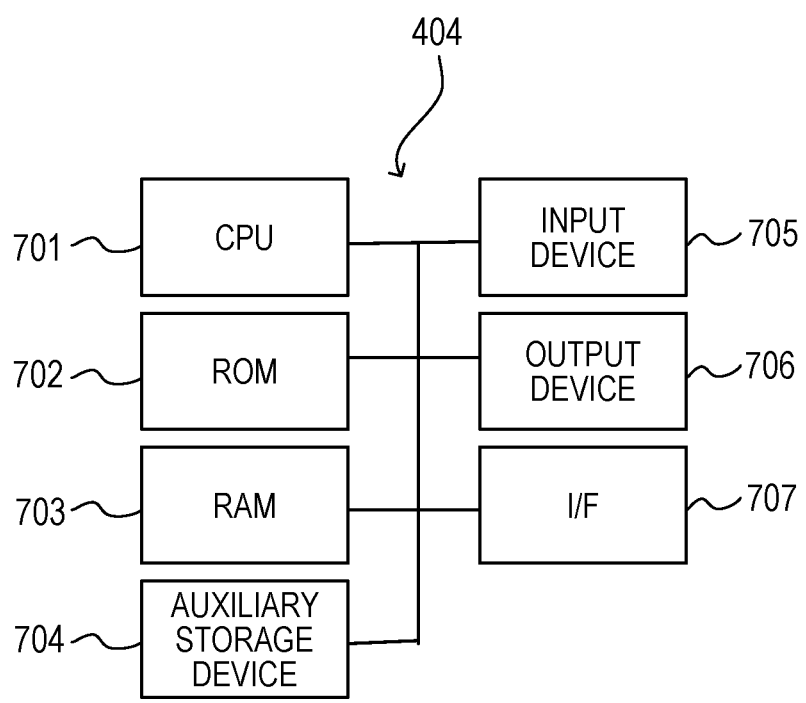
FIG. 7 is a diagram illustrating a hardware configuration example of the cloud print service.

FIG. 7 is a block diagram illustrating a hardware configuration example of a server as a physical resource providing the CPS 404 of FIG. 4. The client terminals 401 to 403 and the CPSs 405 to 406 of FIG. 4 have the same hardware configuration as the CPS 404. The CPS 404 has a CPU 701, a ROM 702, a RAM 703, an auxiliary storage device 704, an input device 705, an output device 706, and an I/F 707.

The CPU 701 directly or indirectly controls components (the ROM 702, the RAM 703, or the like) and executes a program stored in the ROM 702, the RAM 703, or the auxiliary storage device 704. The ROM 702 stores BIOS. The RAM (main storage device) 703 is used as a work area of the CPU 701 and as a temporary storage used for loading a program. The auxiliary storage device 704 is a hard disc drive (HDD), a solid state drive (SSD), or the like storing OS that is basic software or a program. The input device 705 is a keyboard, a pointing device, or the like. The output device 706 is a display, for example. The I/F 707 is an interface used for connection to a network. Although a case where a single CPU 701 performs each process illustrated in a flowchart described later by using a single memory (RAM 703) is described as an example in the present embodiment for illustration purposes, other forms may be employed. For example, it is possible to perform each process illustrated in the flowchart described later in cooperation with a plurality of processors, a plurality of RAMs, a plurality of ROMs, and a plurality of storages. Further, it is also possible to perform each process by using a plurality of server computers. Further, the server can provide a cloud print service to a plurality of different tenants by using a containerization or virtualization technology.

<Setting Window>

FIG. 8 illustrates a window example of an operation unit of the image forming apparatus 407 when the user logs in the image forming apparatus 407, selects a print job from the CPS 404, and performs printing. While the image forming apparatus 407 will be described as an example, the same applies for the image forming apparatuses 408 and 409. In the image forming apparatus 407, user authentication is managed. When the user uses a function of the image forming apparatus 407 such as copying or printing, the user needs to log in the image forming apparatus 407. The login method may be a method by authentication using an ID and a password, a method by authentication using an IC card, a method by biometrics authentication, or the like. When the user who has successfully logged in selects a printing function of the image forming apparatus 407, the image forming apparatus 407 displays a print job list window for the user as illustrated in FIG. 8. In a window of FIG. 8, the image forming apparatus 407 displays a job name, the number of copies, a color setting or the like, for example. In the window of FIG. 8, when the user selects any one of the print jobs and presses "Print", the image forming apparatus 407 receives the corresponding print job from the CPS 404 and performs printing. When the user selects "Delete", the image forming apparatus 407 transmits a deletion request of the print job to the CPS 404 and deletes the corresponding print job from the storage of the CPS 404. Further, when "Cancel" is selected during printing, the image forming apparatus 407 stops and cancels a printing process of a print job being printed.

<Registration of Image Forming Apparatus to CPS>

Figure 9:
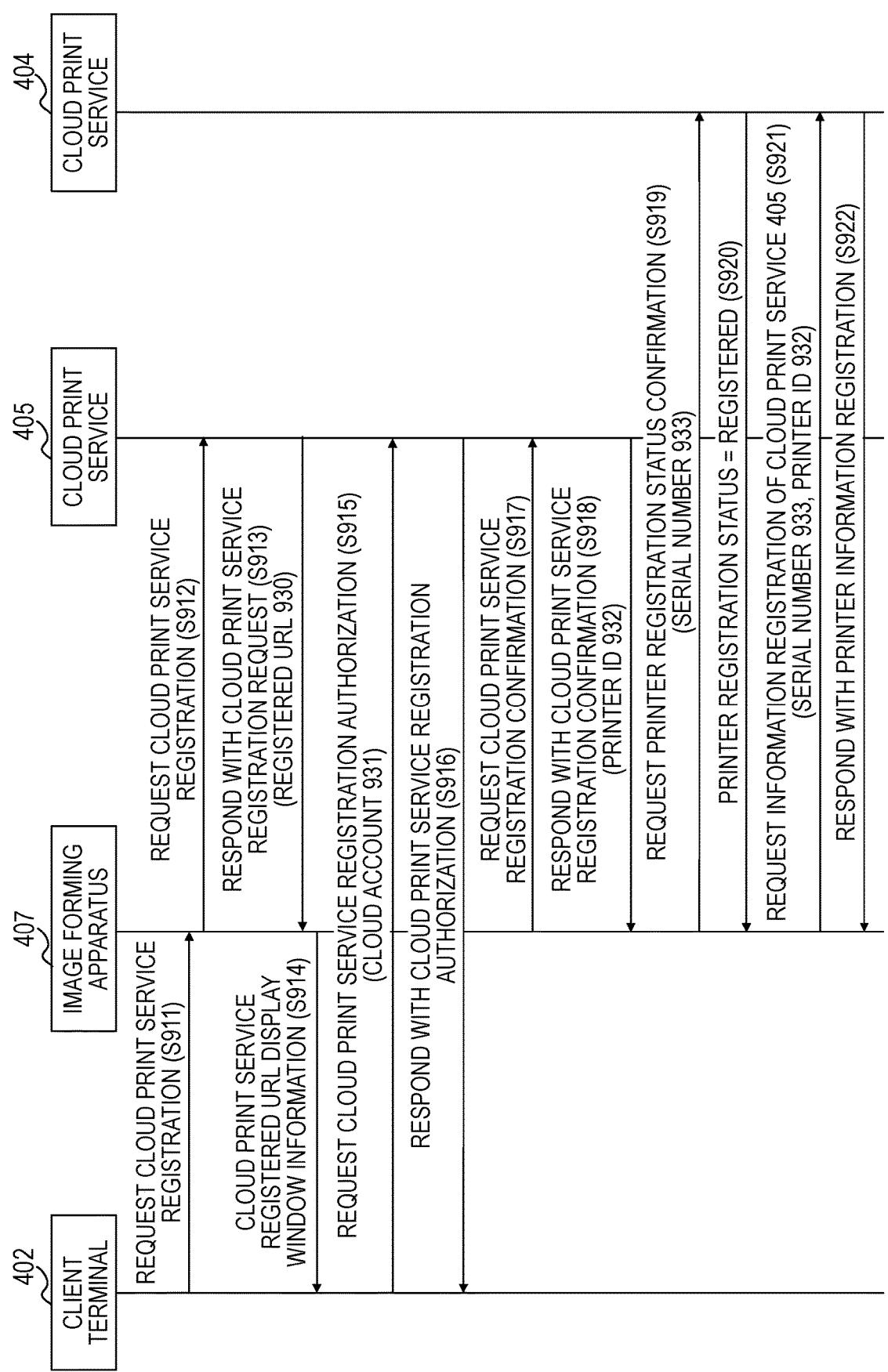
FIG. 9 is a diagram illustrating a registration sequence of the image forming apparatus.

FIG. 9 is a sequence diagram illustrating registration of the image forming apparatus 407 to the CPS 405 and an information registration process to the CPS 404. Note that a registration process for cloud print cooperation illustrated in FIG. 5 has been performed in advance. That is, this is the registration status where it is possible to perform cloud print by using a path of "client terminal—CPS 404—image forming apparatus" (path 1) and a path of "client terminal—CPS 405—CPS 404—image forming apparatus" (path 2). On the other hand, preparations for performing printing via a path of "client terminal—CPS 405—image forming apparatus 407" (path 3) has not been performed. In FIG. 9, when a registration process for printing via a path of "client terminal—CPS 405—image forming apparatus 407" is performed, addition of an output destination printer corresponding to the path 3 is shared with the downstream CPS 405. The description will be specifically described below.

In step S911, the client terminal 402 uses an WebUI client and transmits a cloud print service registration request via the WebUI to the image forming apparatus 407 in accordance with an instruction by the user. In step S912, in response to receiving the cloud print service registration request, the image forming apparatus 407 transmits a cloud print service registration request to the CPS 405. In step S913, in response to receiving the cloud print service registration request, the CPS 405 transmits a cloud print service registration request response including a cloud print service registered URL 930 to the image forming apparatus 407. In step S914, in response to receiving the cloud print service registration request response, the image forming apparatus 407 transmits a registered URL display window information including the cloud print service registered URL 930 to the client terminal 402 via the WebUI. In response to receiving the registered URL display window information, the client terminal 402 displays the registered URL 930 on the WebUI client.

The user operates the WebUI client of the client terminal 402 and accesses the displayed registered URL 930. Accordingly, in step S915, the client terminal 402 transmits a cloud print service registration authorization request including a cloud account 931 to the CPS 405. In step S916, in response to receiving the cloud print service registration authorization request, the CPS 405 transmits a cloud print service registration authorization response to the client terminal 402.

In step S917, the image forming apparatus 407 transmits a cloud print service registration confirmation request to the CPS405. In step S918, in response to receiving the cloud print service registration confirmation request, the CPS 405 transmits a cloud print service registration confirmation response including a cloud printer ID 932 to the image forming apparatus 407. The cloud printer ID 932 is an identifier used for registration of the image forming apparatus 407. In this step, the image forming apparatus 407 is registered in the CPS 405 and can use a cloud print service. That is, a registration process for performing printing via a path of "client terminal—CPS 405—image forming apparatus 407" is completed. In response to the completion of the registration process, a second save region that is a spool region temporarily saving a print job on the CPS 405 is generated on the CPS 405 before the image forming apparatus 407 acquires a print job. This second save region and the above first save region are also referred to as a print queue on a cloud print service or a spool region on a cloud print service.

Subsequently, a process for causing the CPS 405 and the CPS 404 to cooperate with each other is performed. Specifically, a process for ensuring identity of the image forming apparatus 407 registered in the CPS 405 and the CPS 404 is performed. First, in step S919, the image forming apparatus 407 transmits, to the CPS 404, a registration status confirmation request including a serial number 933 used for performing individual identification of a printer in the CPS 404. In step S920, in response to receiving the registration status confirmation request, the CPS 404 transmits, to the image forming apparatus 407, a response representing the registered status as the printer registration status indicating whether or not the image forming apparatus 407 is registered. In step S921, in response to receiving the printer registration status, the image forming apparatus 407 transmits an information registration request of the CPS 405 including the serial number 933 and the printer ID 932 to the CPS 404 in a case of registration. In step S922, in response to receiving the information registration request, the CPS 404 adds information on the printer ID 932 to the information on the image forming apparatus 407 corresponding to the serial number 933 and transmits a printer information registration response to the image forming apparatus 407. These processes enable the CPS 404 to acquire the printer ID 932 used for identifying an individual in the CPS 405 of the registered image forming apparatus 407. This process enables a cooperation process of switching a print job input for the path 2 described later to the path 3 and printing the print job to be performed. Note that, although a case where information sharing is performed on the CPS 404 when the image forming apparatus 407 is registered as a printer that is under the CPS 405 is described as an example in the present embodiment, the embodiment is not limited thereto. For example, the CPS 405 may perform an information registration process (linking process) via a setting window provided to the tenant administrator or the like. In such a case, the CPS 405 inquires whether or not the tenant administrator performs the linking in the status where both of a printer that performs printing via the path 2 (virtual printer) and a printer that performs printing via the path 3 are registered as a printer that is under the CPS 405. When a linking operation is performed by the tenant administrator, the CPS 405 performs process of S919 and the subsequent processes.

<Printing Control by CPS>

Figure 10:
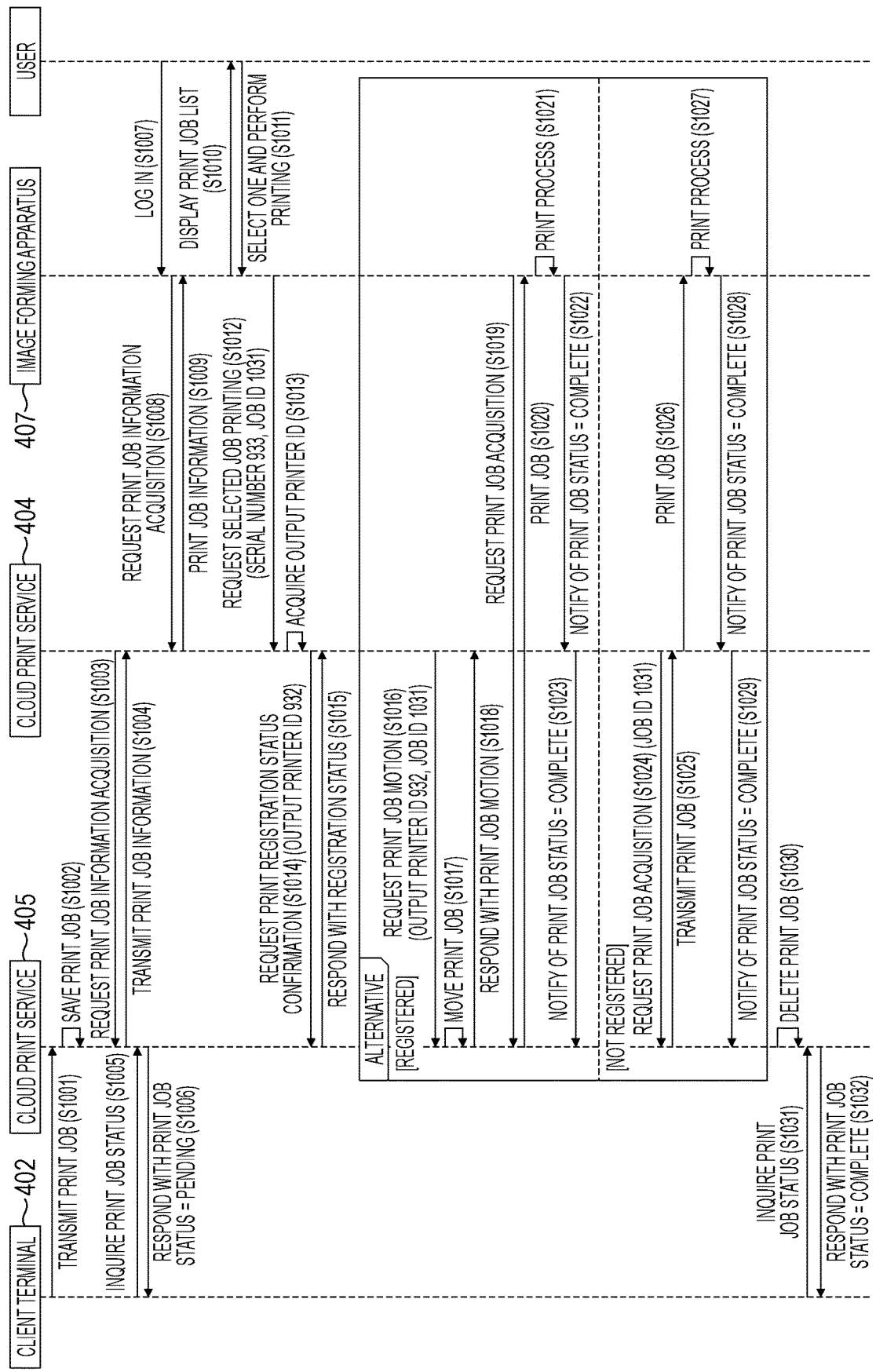
FIG. 10 is a diagram illustrating a printing sequence to the image forming apparatus.

FIG. 10 is a sequence diagram illustrating a print control processing method of the printing system. In step S1001, the client terminal 402 searches for a printer that is under the CPS 405. Subsequently, the user selects a desired printer out of output destination printers found in the search. Herein, description will be provided assuming that a virtual printer that transmits a print job to the CPS 404 is selected as an output destination printer. In response to accepting an instruction of print start by using a print setting window (not illustrated), the client terminal 402 transmits a print job to the CPS 405. In step S1002, the CPS 405 saves (stores) the print job to a first save region (spool region, first storage region) saving a job to be transferred to a virtual printer provided by the CPS 404. The first save region is a region that saves a print job that the CPS 405 causes the image forming apparatus 407 to perform printing via the CPS 404.

In step S1003, the CPS 404 in cloud print service cooperation detects that a new print job has been saved in the CPS 405 and transmits a print job information acquisition request to the CPS 405. The request includes an ID used for uniquely specifying a virtual printer. As illustrated in FIG. 2 and FIG. 3 described above, the detection method may be a polling scheme in which the CPS 404 transmits a print job information acquisition request to the CPS 405 at regular intervals and may be a method of providing a notification from the CPS 405 to the CPS 404 with push notification. In step S1004, the CPS 405 specifies a print job that can be acquired by a virtual printer that is under the CPS 404 and generates print job information including a name, setting information, or the like of the specified print job. Subsequently, the CPS 405 transmits the generated print job information to the CPS404. In this process, the CPS 404 is notified of bibliographic information on standing-by print job that is spooled in the first storage region.

FIG. 11 is a diagram illustrating packet examples of a print job information acquisition request 1101 of step S1003 and a print job information acquisition response 1102 of step S1004. Herein, while a communication protocol will be described with reference to IPP, other protocols can be used. For acquiring print jobs of all users, the print job information acquisition request 1101 sets a Which-Job attribute of an IPP attribute to False, includes job attribute information to be acquired, and transmits a Get-Jobs operation. Further, the print job information acquisition response 1102 is a response including attribute information indicating bibliographic information on the required print job such as an ID, a name, the number of copies, a color setting, and a print job owner name of each print job.

In step S1005, the client terminal 402 transmits a user print job status inquiry to the CPS 405. At this time, the print job of the CPS 405 has not yet been printed and has been saved in the storage of the CPS 405. Thus, in step S1006, the CPS 405 transmits, to the client terminal 402, a response of Pending or Pending-Held indicating that a print job is being saved as the print job status. The CPS 405 transmits the print job status indicating that the print job is not completed to the client terminal 402 after the print job is saved in the first save region in step S1002 and before the print job is deleted from the first save region in step S1030. Therefore, the client terminal 402 can know the correct job status.

Then, in step S1007, the user logs in the image forming apparatus 407 in order to perform printing. In step S1008, in response to detecting the login, the image forming apparatus 407 transmits, to the CPS 404, a print job information acquisition request from the user who has logged in. In step S1009, in response to receiving the print job information acquisition request, the CPS 404 transmits print job information only on the user to the image forming apparatus 407.

FIG. 12 is a diagram illustrating packet examples of a print job information acquisition request 1201 of step S1008 and a print job information acquisition response 1202 of step S1009. To require only print job information only on the specific user, the print job information acquisition request 1201 sets a Which-Job attribute to True and designates a user name to Requesting-user-name. Herein, other attributes such as Requesting-user-uri may be used as long as the user name can be uniquely identified. Accordingly, in step S1010, the image forming apparatus 407 displays a list of the received print job information on the operation unit of the image forming apparatus 407 as illustrated in FIG. 8.

In step S1011, the user selects any one of the print jobs intended to print from the list of the print job information of FIG. 8. The image forming apparatus 407 then inputs an instruction of performing printing of the selected print job based on the print job information. In step S1012, the image forming apparatus 407 transmits the serial number 933 of the image forming apparatus 407, a job ID 1031 of the selected print job, and a print request of the selected print job to the CPS 404.

Herein, the CPS 404 has acquired only the print job information indicating bibliographic information such as a print setting from the CPS 405. That is, an actual print job (actual print data) is not saved in the storage of the CPS 404, and the print job (actual print data) is saved in the CPS 405 at this point of time. In step S1013, the CPS 404 receives the print request of the selected print job from the image forming apparatus 407. The request includes information such as a serial number that uniquely specifies the image forming apparatus 407. Then, the CPS 404 acquires an ID (output printer ID 932) of an output destination printer that is registered under the CPS 405 and can transfer the print job to the image forming apparatus 407 without via the CPS 404 by using information that uniquely specifies the image forming apparatus 407 included in the request.

In step S1014, the CPS 404 transmits the output printer ID 932 and a printer registration status confirmation request to the CPS 405. In S1015, the CPS 405 confirms whether or not a printer that has an attribute of an output printer ID 932 and can transfer the print job to the image forming apparatus 407 without via the CPS 404 is registered in a printer that is under the CPS 405. Then, the CPS 405 transmits, to the CPS 404, whether or not a printer that can transfer the print job to the image forming apparatus 407 without via the CPS 404 is registered in the CPS 405 as a registration status response.

[Registered]

Description will be provided for a case where the CPS 405 transmits, to the CPS 404, a response representing that a printer that can transfer the print job to the image forming apparatus 407 without via the CPS 404 is registered in the CPS 405 in step S1015 as a registration status response. In step S1016, in response to receiving a response representing that the printer is registered, the CPS 404 transmits, to the CPS 405, a print job motion request including an output printer ID 932 of the image forming apparatus 407 that is an output target and a job ID 1031 of the print job designated by the user. In S1017, in response to receiving the print job motion request, the CPS 405 moves the print job of the job ID 1031 saved in the first save region in S1002 to a printer job save region (second save region, second storage region) that matches the output printer ID 932 and is under the CPS 405. The second save region is a region that saves a print job that the CPS 405 causes the image forming apparatus 407 to perform printing without via the CPS 404. In step S1018, in response to the print job motion request, the CPS 405 transmits a print job motion response indicating success or failure to the CPS 404. This process means that a print job to be printed via the CPS 404 and stored in a print queue used for a virtual printer is moved to a print queue used for a printer that can transfer a print job to the image forming apparatus 407 without via the CPS 404. The print job motion response is a predetermined notification.

FIG. 13 is a diagram illustrating a packet example of the print job motion request 1301 of step S1016 and the print job motion response 1302 of step S1018. The print job motion request 1301 designates job-id and to-printer-id used for designating a specific print job of an output target and the image forming apparatus 407 of an output destination, respectively. Herein, spool-uri of a storage destination for the print job of the image forming apparatus 407 of an output target or the like may be used as long as the to-printer-id can be uniquely identified.

In step S1019, the image forming apparatus 407 detects that a new print job is generated on the CPS 405 in a polling scheme of FIG. 2 or an event scheme of FIG. 3 and transmits a print job acquisition request to the CPS 405. In step S1020, in response to receiving the print job acquisition request, the CPS 405 transmits the print job (actual print data) saved in the second save region of the CPS 405 to the image forming apparatus 407. In accordance with the process of S1002, a print job of the job ID 1031 scheduled to be printed via the path 2 and saved in the first save region that is a spool region of a virtual printer has been moved to the second save region that is a spool region prepared for performing printing via the path 3. Accordingly, herein, a print job corresponding to the job ID 1031 is directly transmitted to the image forming apparatus 407 without via the CPS 404.

In step S1021, in response to receiving the print job from the CPS 405, the image forming apparatus 407 performs a printing process of the received print job. In step S1022, in response to completing the printing process, the image forming apparatus 407 transmits a completion notification to the CPS 404 as the print job status. In step S1023, in response to receiving the completion notification of the print job status, the CPS 404 transmits the completion notification directly to the CPS 405 as the print job status of the corresponding print job.

[Not Registered]

Description will be provided for a case where the CPS 405 transmits, to the CPS 404, a response representing that the image forming apparatus 407 is not registered in the CPS 405 in step S1015 as a registration status response. In step S1024, in response to receiving the response representing the unregistered status, the CPS 404 transmits a print job acquisition request to the CPS 405. In step S1025, in response to receiving the print job acquisition request, the CPS 405 transmits a print job saved in the first save region of the CPS 405 to the CPS 404. That is, the CPS 405 transfers a print job to another cloud print service. In step S1026, in response to receiving the print job (actual print data) from the CPS 405, the CPS 404 transmits the received print job to the image forming apparatus 407.

In step S1027, in response to receiving the print job from the CPS 404, the image forming apparatus 407 performs a printing process of the received print job. In step S1028, in response to completing the printing process, the image forming apparatus 407 transmits a completion notification to the CPS 404 as the print job status. In step S1029, in response to receiving the completion notification of the print job status, the CPS 404 transmits the completion notification to the CPS 405 as the print job status of the corresponding print job.

In step S1030, in response to receiving the completion notification of the print job status of step S1023 or S1029, the CPS 405 deletes the print job saved in step S1002 from the storage of the CPS 405. In step S1031, the client terminal 402 transmits a job status inquiry to the CPS 405. In step S1032, since the print job is completed, the CPS 405 transmits a completion response to the client terminal 402 as the print job status. After the print job is deleted in step S1030, the CPS 405 transmits the print job status indicating the completion of the print job to the client terminal 402.

Accordingly, the client terminal 402 can always know the correct print job status. Since the print job is saved only in the storage of the CPS 405 and is not transferred to the CPS 404, the minimum storage consumption and traffic can be achieved.

As described above, even when the user performs a print performing request, the CPS 404 does not save the print job. If it is only necessary to cause the image forming apparatus 407 to display a print job information list, it is not required for the CPS 404 to save the print job, and it is sufficient to acquire only print job information.

Figure 14:
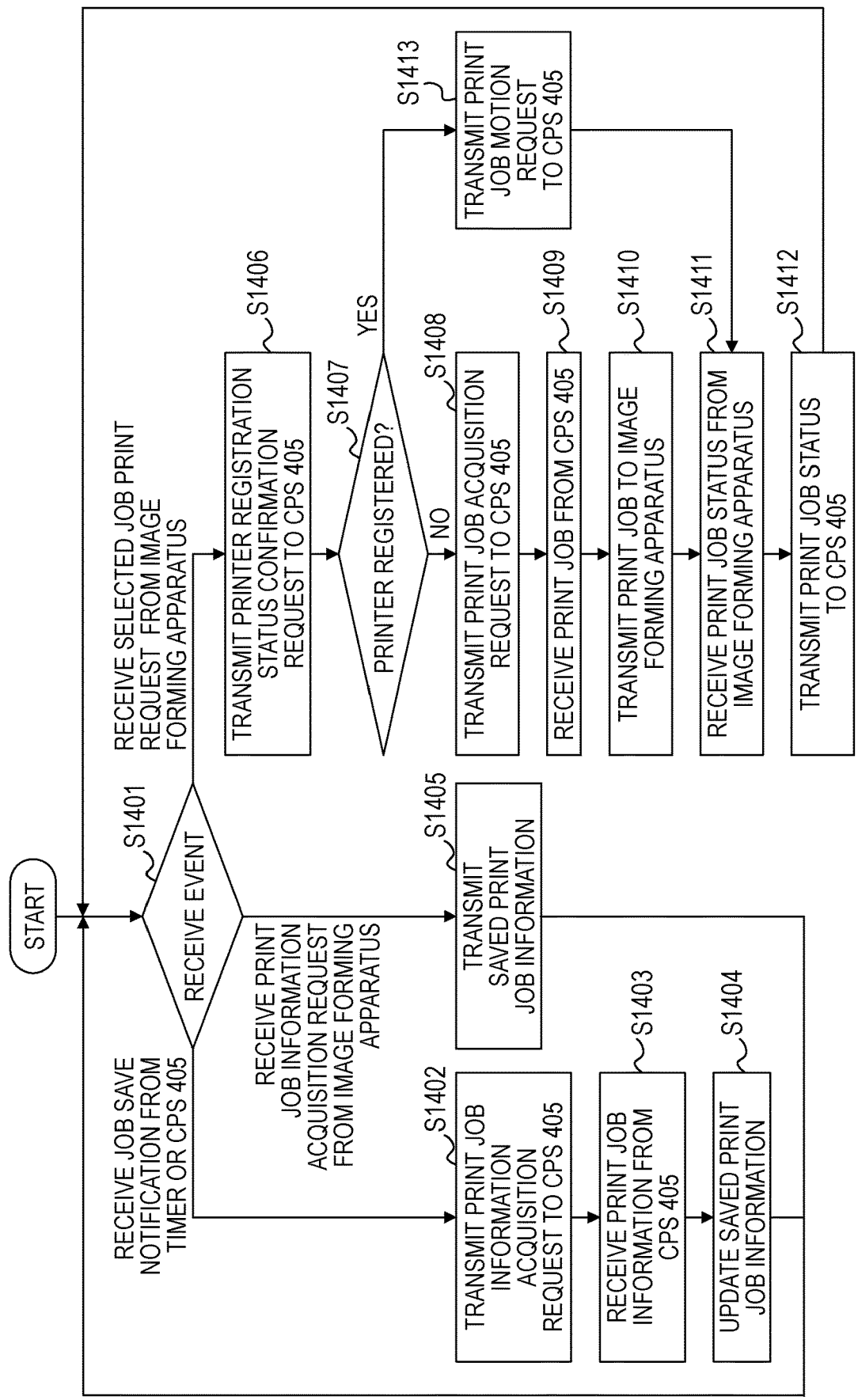
FIG. 14 is a flowchart illustrating a process performed by the cloud print service.

FIG. 14 is a flowchart illustrating a processing method of the CPS 404. In step S1401, the CPU 701 is in a standby state before receiving an event. If the CPU 701 receives a print job save notification with a push notification from the CPS 405 or if a timer time event of periodic transmission to the CPS 405 occurs, the process proceeds to step S1402. Further, if the CPU 701 receives a print job information acquisition request from the image forming apparatus 407, the process proceeds to step S1405. Further, if the CPU 701 receives a print request of the selected print job from the image forming apparatus 407, the process proceeds to step S1406.

In step S1402, the CPU 701 transmits a print job information acquisition request to the CPS 405. The request includes information used for specifying a virtual printer that performs printing via the path 2 that is under the CPS 405. Next, in step S1403, the CPU 701 receives print job information from the CPS 405. Next, in step S1404, the CPU 701 updates the print job information saved in the CPS 404 and returns to step S1401.

In step S1405, the CPU 701 extracts only the required user print job information out of the print job information saved in the CPS 404, transmits the extracted print job information to the image forming apparatus 407, and returns to step S1401.

In step S1406, the CPU 701 transmits a printer registration status confirmation request to the CPS 405. In step S1407, the CPU 701 receives a registration status response from the CPS 405. Then, if the image forming apparatus 407 is not registered in the CPS 405, the CPU 701 proceeds to step S1408, and if the image forming apparatus 407 is registered in the CPS 405, the CPU 701 proceeds to step S1413.

In step S1413, the CPU 701 transmits the print job motion request described in the sequence described above to the CPS 405 and proceeds to step S1411.

In step S1408, the CPU 701 transmits a print job acquisition request to the CPS 405. Next, in step S1409, the CPU 701 receives a print job from the CPS 405. Next, in step S1410, the CPU 701 transmits the received print job directly to the image forming apparatus 407 and proceeds to step S1411.

In step S1411, the CPU 701 receives the print job status from the image forming apparatus 407. Next, in step S1412, the CPU 701 transmits the print job status to the CPS 405 and returns to step S1401.

Second Embodiment

<Process of Enabling CPS 404 to Move Print Job Present in CPS 405>

In the second embodiment of the present invention, description will be provided for a setting update process for enabling the CPS 404 to move a print job present in the CPS 405 to a job save region of the image forming apparatus 407 that is an actual output target. By enabling setting for each image forming apparatus as to whether or not job motion on the CPS 405 can be performed, it is possible to enforce operation of setting as to whether or not job motion is permitted on a cloud print service basis or in accordance with an image forming apparatus.

FIG. 15 is a sequence diagram illustrating a part of the registration process of the image forming apparatus 407 to the CPS 405 and the information registration process to the CPS 404 when the CPS 405 can set whether or not to permit motion to a job save region for each of the image forming apparatuses 407 to 409. FIG. 15 is a part of the process of steps S917 to S922 of FIG. 9, and the same step number indicates the same process. FIG. 15 is a process in which steps S1501 to S1504 are added to FIG. 9. Steps S1501 to S1504 correspond to a setting update process for enabling the CPS 405 to move a job to the job save region of the image forming apparatus 407.

In step S921, the image forming apparatus 407 transmits an information registration request from CPS 405 to the CPS 404. In step S1501, the CPU 701 of the CPS 404 receives the information registration request and identifies the printer ID 932 of a printer that is registered under the CPS 405 and can transfer a print job to the image forming apparatus 407 without via the CPS 404. Subsequently, the CPU 701 of the CPS 404 transmits a sharing state confirmation request including the identified printer ID 932 to the CPS 405. The sharing state confirmation request is a motion permission confirmation request.

In step S1502, the CPS 405 receives the sharing state confirmation request, references the printer ID 932, and determines whether or not a print job is permitted to be moved to a job save region (spool region) corresponding to the printer ID 932. If such motion is not permitted, the CPS 405 transmits a printer sharing state as no-sharing to the CPS 404. The printer sharing state of no-sharing corresponds to no-permission information on not permitting motion of a print job to the job save region of the image forming apparatus 407.

In step S1503, in response to receiving no-sharing as the printer sharing state, the CPU 701 of the CPS 404 transmits a sharing addition request including the printer ID 932 to the CPS 405. The sharing addition request is a motion permission request for moving a print job to the job save region of the image forming apparatus 407. This request is performed based on API provided by the CPS 405, for example.

In step S1504, in response to receiving the sharing addition request, the CPS 405 updates the setting to permit motion of a print job to the job save region of the image forming apparatus 407 and transmits a sharing addition response to the CPS 404. Note that a setting change from the external using API may be inhibited due to the policy on the tenant of the CPS 404. In such a case, the request will fail. When an addition request fails, the same process is performed as when a printer that can transfer a print job to the image forming apparatus 407 without via the CPS 404 is not registered under the CPS 404. That is, the sequence of transferring print data forming a print job from the CPS 405 to the CPS 404 and transferring the print data to the image forming apparatus 407 as illustrated as an example in the alternative sequence of "Not registered" of FIG. 5 or FIG. 10 is employed.

In step S922, in response to receiving the sharing addition response, the CPU 701 of the CPS 404 adds information on the printer ID 932 to information on the image forming apparatus 407 corresponding to the serial number 933 and transmits a printer information registration response to the image forming apparatus 407.

As described above, the printing system can be set for each of the image forming apparatuses 407 to 409 as to whether or not job motion on the CPS 405 can be performed. Also in such a case, the user can easily move a job from the CPS 404 to the image forming apparatus 407 that actually outputs the job (steps S1016 and S1017 of FIG. 10) by just registering the image forming apparatus 407 to the CPS 405.

FIG. 16 is a sequence diagram illustrating a part of the print control process performed by the CPS 404 when the CPS 405 can set whether or not to permit motion to a job save region for each of the image forming apparatuses 407 to 409. FIG. 16 is a part of the process of steps S1011 to S1016 of FIG. 10, and the same step number indicates the same process. FIG. 16 is a process in which steps S1601 to S1604 are added to FIG. 10.

In step S1014, the CPU 701 of the CPS 404 transmits a registration status confirmation request of a printer to the CPS 405. In step S1015, the CPS 405 transmits a registration status response of the image forming apparatus 407 to the CPS 404. If the registration status response of the image forming apparatus 407 is "Registered", in step S1016, the CPU 701 of the CPS 404 transmits a print job motion request to the CPS 405. Thus, in the CPS 404, job motion to the job save region of the image forming apparatus 407 present in the CPS 405 is required to be permitted. Steps S1601 to S1604 correspond to a setting update process for enabling the CPS 404 to move a job to the job save region of the image forming apparatus 407 in the print control process flow.

After step S1015, if the CPU 701 of the CPS 404 receives "Registered" as the registration status response of the image forming apparatus 407, the process proceeds to step S1601. In step S1601, the CPU 701 of the CPS 404 transmits a sharing state confirmation request including the printer ID 932, which is the ID of the image forming apparatus 407, to the CPS 405. The sharing state confirmation request is a motion permission confirmation request.

In step S1602, in response to receiving the sharing state confirmation request, the CPS 405 references the printer ID 932 and determines whether or not motion of a print job to the job save region of the image forming apparatus 407 is permitted. If such motion is not permitted, the CPS 405 transmits the printer sharing state as no-sharing to the CPS 404. The printer sharing state of no-sharing corresponds to no-permission information on not permitting motion of a print job to the job save region of the image forming apparatus 407.

In step S1603, if the CPU 701 of the CPS 404 receives no-sharing as the sharing state, the CPU 701 of the CPS 404 transmits a sharing addition request including the printer ID 932 to the CPS 405. The sharing addition request is a motion permission request for moving a print job to the job save region of the image forming apparatus 407.

In step S1604, in response to receiving the sharing addition request, the CPS 405 updates the setting to permit motion of a print job to the job save region of the image forming apparatus 407 and transmits a sharing addition response to the CPS 404.

In step S1016, in response to receiving the sharing addition response, the CPU 701 of the CPS 404 transmits, to the CPS 405, a print job motion request including the output printer ID 932 of the image forming apparatus 407, which is the output target, and the job ID 1031 of the print job designated by the user.

As described above, the printing system can be set for each of the image forming apparatuses 407 to 409 as to whether or not job motion on the CPS 405 can be performed. Also in such a case, when the user provides a print instruction from the image forming apparatus 407, the setting as to whether or not to permit job motion is updated, and job motion from the CPS 404 to the image forming apparatus 407 that actually outputs the job (steps S1016 and S1017 of FIG. 10) is enabled.

The printing system can be set for each of the image forming apparatuses 407 to 409 as to whether or not job motion on the CPS 405 can be performed. In such a case, the printing system automatically updates the setting as to whether or not to permit job motion at registration of the image forming apparatus 407 or at printing by the image forming apparatus 407 of FIG. 15. Accordingly, the printing system can easily move a job from the CPS 404 to the image forming apparatus 407 that actually outputs the job (steps S1016 and S1017 of FIG. 10) without performing additional setting every time the image forming apparatus 407 is added.

Note that, in order for the CPS 404 to suitably manage authority of a sharing addition request to the CPS 405 (step S1603 of FIG. 16), the CPS 404 in cooperation may be configured to set in advance whether or not to enable sharing addition.

According to the first and second embodiments, the printing system registers, also to the CPS 404, the printer ID 932 that uniquely identifies the image forming apparatus 407 on the CPS 405 when registering the image forming apparatus 407 to the CPS 405. Accordingly, the CPS 404 can identify the image forming apparatus 407 on the CPS 405.

When a print request is received from the image forming apparatus 407, the CPS 404 requests motion of a print job saved in the CPS 405 to the job save region of the image forming apparatus 407 without acquiring the print job from the CPS 405 where the print job is saved. Accordingly, just with the registration of the image forming apparatus 407 to the CPS 405, the image forming apparatus 407 can acquire a print job saved in the storage of the CPS 405 without the print job being transferred from the CPS 405 to the CPS 404. Such a print job is saved only to the storage of the CPS 405, and the problems of duplication of saved resources and increase in the amount of transfer can be solved.

Modified Example

In the second embodiment, although the case where CPS 404 transmits a permission request to the CPS 405 by using API has been illustrated as an example, the invention is not limited thereto. For example, the tenant administrator of the CPS 405 or the like may use a device management window or the like of the CPS 404 to perform sharing setting of a printer that can transfer a print job to the image forming apparatus 407 without via the CPS 404 with a virtual printer that implements printing via the CPS 404.

Further, in the first embodiment and the second embodiment, the case where the CPS 404 requests job motion and thereby implements job motion on the CPS 405 has been illustrated as an example. However, the determination as to whether or not to perform job motion is not limited to those relying on the scheme described above. For example, the CPS 405 may be configured to autonomously determine whether or not to perform a motion process for moving a print job saved in the first save region, which is provided for a virtual printer that performs printing via the CPS 404, to the second save region.

Specifically, the CPS 404 that has received a selected job print request described with S1012 transfers the request to the CPS 405. When the CPS 405 accepts a print request to print a job of a virtual printer that is supposed to route via another CPS, the CPS 405 further performs the following process.

First, the CPS 405 specifies that a printing apparatus having a physical resource used for printing is the image forming apparatus 407 based on the serial number included in the request. Subsequently, the CPS 405 determines whether or not a printer that can transfer a print job to the image forming apparatus 407 without via the CPS 404 is registered under the CPS 405. If such a printer is registered, the CPS 405 moves a print job saved in the first region provided for the virtual printer that performs printing via the CPS 404 to a spool region used for a printer that can transfer a print job to the image forming apparatus 407 without via that CPS 404.

The CPS 405 then transmits, to the CPS 404, a response indicating that the print job is transmitted to the image forming apparatus 407 via another path (path 3) for cost reduction. On the other hand, when a printer that can transfer a print job to the image forming apparatus 407 without via the CPS 404 is not registered, a print job (actual print data) corresponding to the selected job print request is controlled to be transmitted to the CPS 404. With the modified example described above, it is possible to determine on the CPS 405 side whether or not to perform job motion.

According to one aspect of the present invention, it is possible to perform a printing process of a print job at an image forming apparatus by storing the print job in only the first cloud print service without storing the print job in the second cloud print service.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-098788, filed Jun. 5, 2020, which is hereby incorporated by reference herein in its entirety.

What is claimed is:

1. A method of providing a cloud print service, the method comprising:
receiving, from a print client, a print job addressed to a virtual printer associated with another cloud print service that is different from the cloud print service and storing the print job in a spool region; and
performing control to select a process of 1) transferring, to the another cloud print service, print data forming the print job addressed to the virtual printer stored in the spool region or 2) providing the print data forming the print job addressed to the virtual printer stored in the spool region, without via the another cloud print service, to an image forming apparatus having image forming hardware corresponding to the virtual printer.

2. The method according to claim 1, wherein in a case where a request for acquiring the print job addressed to the virtual printer stored in the spool region is received from the another cloud print service, the control to select a process is performed.

3. The method according to claim 2, wherein
the request for acquiring a print job addressed to the virtual printer received from the another cloud print service includes specifying information that specifies an image forming apparatus having the image forming hardware corresponding to the virtual printer, and
in a case where the image forming apparatus corresponding to the specifying information is registered in the cloud print service as an image forming apparatus configured to perform printing via the cloud print service, print data forming the print job addressed to the virtual printer stored in the spool region is provided to the image forming apparatus having the image forming hardware and corresponding to the specifying information without via the another cloud print service.

4. The method according to claim 3, further comprising, in a case where print data forming the print job addressed to the virtual printer stored in the spool region is provided to the image forming apparatus without via the another cloud print service by performing the control to select a process, notifying the another cloud print service of predetermined information.

5. The method according to claim 1, further comprising:
notifying the another print service of information including identification information on the print job stored in the spool region; and
receiving, from the another cloud print service, a first request including identification information that identifies a print job to be printed and specifying information that specifies an image forming apparatus that is a transfer destination of the print job, wherein in a case where the first request is received from the another cloud print service, print data forming a print job specified based on the identification information is provided without via the another cloud print service out of print jobs addressed to the virtual printer stored in the spool region to an image forming apparatus having the image forming hardware corresponding to the virtual printer and specified by the specifying information.

6. The method according to claim 5, wherein in a case where a second request for acquiring the print job addressed to the virtual printer stored in the spool region is received from the another cloud print service, a print job corresponding to the second request is specified out of print jobs addressed to the virtual printer stored in the spool region, and print data forming the specified print job is provided to the another cloud print service.

7. A server that provides a cloud print service, the server comprising:
  at least one memory that stores a set of instructions; and
  at least one processor that executes the instructions, the instructions, when executed, causing the server to perform operations comprising:
  receiving, from a print client, a print job addressed to a virtual printer associated with a second cloud print service that is different from the cloud print service and storing the print job in a spool region; and
  performing control to select a process of 1) transferring, to the another cloud print service, print data forming the print job addressed to the virtual printer stored in the spool region or 2) providing print data forming the print job addressed to the virtual printer stored in the spool region, without via the another cloud print service, to an image forming apparatus having image forming hardware corresponding to the virtual printer.

8. A method of providing a cloud print service, the method comprising:
  receiving, from a print client, a print job addressed to a virtual printer associated with another cloud print service that is different from the cloud print service and storing the print job in a spool region;
  in a case where a first request for acquiring a print job addressed to the virtual printer stored in the spool region is received from the another cloud print service, specifying a print job corresponding to the first request out of print jobs addressed to the virtual printer and stored in the spool region and providing print data forming the specified print job to the another cloud print service; and in a case where a second request including identification information that identifies a print job to be printed and specifying information that specifies an image forming apparatus that is a transfer destination of the print job is received from the another cloud print service, providing print data forming a print job specified by the identification information out of print jobs stored in the spool region, without via the another cloud print service, to an image forming apparatus having image forming hardware and specified by the specifying information.

9. A method of providing a second cloud print service that cooperates with a first cloud print service, the method comprising:
  receiving a print request for a print job stored in the first cloud print service from an image forming apparatus; and
  in a case where an image forming apparatus that is a sender of the print request is registered in the first cloud print service as an image forming apparatus that is under the first cloud print service, transmitting, to the first cloud print service, a transfer request including identification information on a print job corresponding to the print request and specifying information that specifies an image forming apparatus indicating a transfer destination of the print job.

10. The method according to claim 9, further comprising:
  in a case where the image forming apparatus that is a sender of the print request is not registered in the first cloud print service as an image forming apparatus that is under the first cloud print service, transmitting an acquisition request of a print job corresponding to the print request to the first cloud print service; and
  transmitting print data forming a print job acquired from the first cloud print service based on the acquisition request to the image forming apparatus that is the sender.

11. The method according to claim 9, further comprising: determining whether or not the image forming apparatus that is a sender of the print request is registered in the first cloud print service as an image forming apparatus that is under the first cloud print service.

12. The method according to claim 9, wherein when the transfer request is received in the first cloud print service, a process of providing print data forming a print job to an image forming apparatus specified by the specifying information without via the second cloud print service is caused in the first cloud print service.

* * * * *